REFLECTED BINARY DIGITAL-TO-ANALOG CONVERTER FOR SYNCHRO DEVICES

Filed Nov. 1, 1955

INVENTOR
S. B. PFEIFFER
BY [signature]
ATTORNEY

United States Patent Office 2,803,003 Patented Aug. 13, 1957

2,803,003

REFLECTED BINARY DIGITAL-TO-ANALOG CONVERTER FOR SYNCHRO DEVICES

Sigmund B. Pfeiffer, New Providence, N. J., assignor to Bell Telephone Laboratories, Incorporated, New York, N. Y., a corporation of New York Application November 1, 1955, Serial No. 544,175

20 Claims. (Cl. 340—347)

This invention relates to digital-to-analog conversion and more particularly to converters arranged to accept reflected binary code groups and directly synthesize analog output suitable for use, as an example, in operating synchro or resolver type devices.

The advantages and disadvantages of both analog and digital data systems are well known to those skilled in the art, and in many instances it is possible to realize the advantages of each system through digital-to-analog converters which transfer data between mediums. In general, a digital-to-analog converter is intended to develop from each applied code group of pulses a single quantity some characteristic of which is a measure of the analog quantity represented by that code. There are many possible analog mediums into which the digital data may be converted, for example, voltage, displacement, etc. The analogs corresponding to each code group may be employed as produced or those corresponding to several successive groups combined to produce a replica of a signal wave as in pulse code transmission.

A wide variety of converters has been devised, and these have been classified in the IRE Convention Reports, Information Theory and Computers, March 1953, page 108, as counting, reading, and weighting types. The reading type of converter with which the present invention is primarily concerned is based upon a switching system which selects a different output circuit for every applied code combination such that the proper analog output is delivered for each code combination.

As one application of the reading type converted, it has previously been proposed to approximate analog signals represented by successively transmitted code groups. The approximated analog composed of straight line segments each representing a continuous range of amplitudes is generated by selectively modulating an alternating current power supply in accordance with the amplitudes encoded at the transmitter. The approximated analog output, which is effectively an alternating current wave of the proper frequency modulated by the transmitted information, is applied to the stator of a synchro causing the rotor to turn through the angle represented by the digital input. The approximated analog output can reproduce the encoded analog signal to a degree of accuracy greater than can be produced as a shaft rotation by even the most precise synchro resolvers. The use of such a converter eliminates the necessity of encoding a large number of amplitudes at the transmitter each of which would be required to be converted individually to reconstruct the transmitted analog as in the case of the more complicated type digital-to-analog converters.

It is an object of the present invention to provide an improved reading type converter responsive to reflected binary or Gray code for approximately analog signals which is less complex and requires substantially less power than those appearing in the prior art.

Synthesis of suitable analog outputs for operating synchro resolvers directly from received binary codes is made practical by the fact that as the transmitter shaft is rotated its angular position may be represented by a sinusoid. Thus, the conversion process may be simplified since the variations of amplitude with shaft position must fall on a predetermined sinusoid. According to prior arrangements such sinusoids have been approximated as proposed by S. J. O'Neil in an article entitled "Network for digital-to-analogue shaft position transducers" appearing in AIEE Transactions, November 1954, on pages 454 through 456, but means are not available for producing outputs in response to reflected binary or Gray code with the resultant advantages. In addition an unduly complicated switching circuit rendered the prior converters of this general type as complex as the more usual decoder-servo type converter if the number of straight line segments approximated is increased sufficiently to attain reasonable accuracy of reproduction of the encoded analog signal.

In accordance with the present invention a source of alternating current of the frequency required for the operation of the synchro resolver or like device is effectively modulated along an approximated sinusoid in accordance with the angular position represented by a particular code group. An appropriate magnitude is determined for each straight line segment comprising the approximated sinusoid and the magnitudes for each segment are obtained selectively from taps on a power transformer. The slopes of the segments are obtained by varying the selected magnitude in response to various code groups which also vary with the angular position of the transmitter shaft. Here multislope approximation is used and one part of each received group of code pulses arranges the connections to power transformer taps to produce the magnitude or slope voltage for each segment. The end points of each straight line segment of the approximated sinusoid are a particular proportion of the maximum amplitude of the sinusoid, and for definition purposes the slope voltage is the difference between end point voltages of the associated segment. Another part of the code group comprising the less significant digits operates switches between a series of autotransformers to evaluate or produce a range of variation of the selected slope voltage along a predetermined slope in accordance with particular code groups. Finally, the remaining digits operate switches to combine the segments in the proper order and polarity to create the sinusoid characteristic of the shaft rotation as represented by a progression of received code groups. The resulting output is essentially a sinusoidal envelope modulated upon the power frequency as a carrier.

A second such envelope may be obtained by combining the segments in a similar fashion to provide an output suitable for a "two phase" synchro which with the first envelope may be converted to a "three phase" signal as required. The words "two phase" and "three phase" do not carry the usual interpretation, since the carrier voltages are in time phase with each other; however the envelopes described acquire a "space phase" relation with each other since the stator windings of two and three phase synchros are displaced 90 and 120 degrees respectively. As a result of the progression of code groups with time, these envelopes may also acquire a "time phase" relation but the carrier voltages of each envelope remain in "time phase."

The invention gains further simplicity from the use of the reflected binary code since the variation in the number of pulses in the code matrix is cyclic in a manner not unlike the variation of a sinusoid.

Briefly summarizing, the code groups representing shaft position are received and the code elements in the group delivered to their associated means which simultaneously decode the code group and synthesize approximated sinusoidal voltages for operating synchro devices to reproduce the shaft position indicated by the code group. It is evident that at any instant the synchro shaft position will be that represented instantaneously by the code group received.

The above and other features of the invention will be described in the following detailed specification taken in connection with the drawings in which solely for the purpose of illustration half of the code group is employed for evaluation purposes with the remaining half being employed to control the number and polarity of slopes in the approximated sinusoids:

Figure 1:
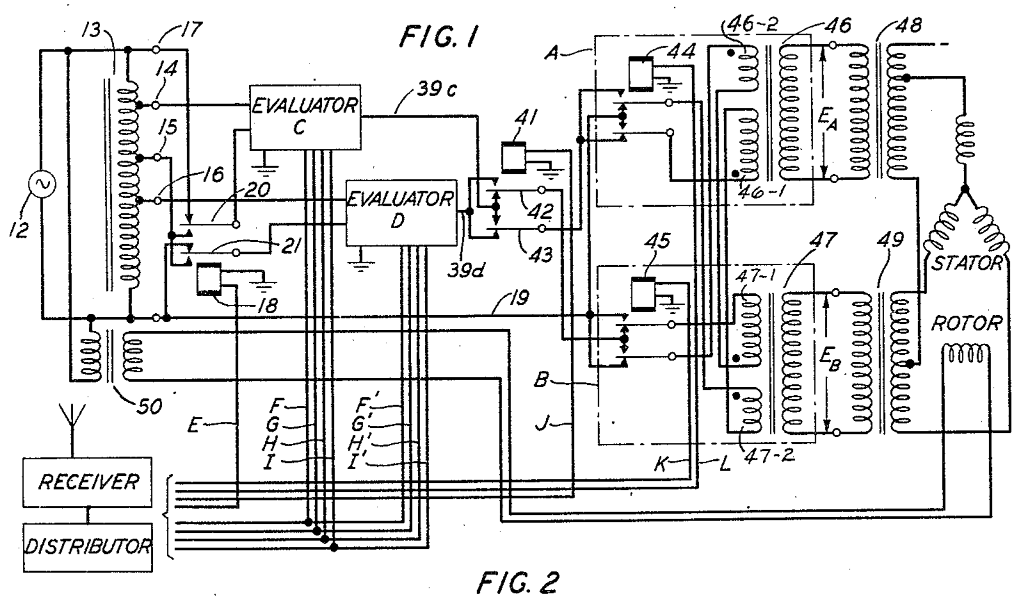
Fig. 1 is a schematic circuit diagram of one embodiment of the converter according to the invention.

As shown in the schematic circuit of Fig. 1, a radio receiver 10 and a distributor 11 of well known design receive and deliver the pulse code groups to the decoder. It is to be understood that the pulse code groups may be transmitted by radio or otherwise, and may be received in parallel or serially from the transmission facility. In the described embodiment of the invention the two most significant digits are supplied to relays 44 and 45, respectively, by means of leads K and L, respectively. The third most significant digit is supplied to relay 41 by means of lead J. The fourth most significant digit is supplied to relay 18 by means of lead E. The four remaining digits are delivered to evaluators C and D each having relays 26 through 29 (see Figs. 1 and 2) with the most significant of the remaining digits being supplied to relays 26 by means of leads F and $F^1$. The second most significant of the remaining digits is supplied to relays 27 by means of leads G and $G^1$. The third most significant of the remaining digits is supplied to relays 28 by means of leads H and $H^1$ and the least significant code digit is supplied to relays 29 by means of leads I and $I^1$. A source of potential 12 of amplitude E and having a frequency as required for operation of the synchro devices to be controlled is directly connected to an autotransformer 13 the winding of which is tapped at points providing outputs of .924E, .707E and .383E. It is from these alternating current voltages that the required sinusoidal envelopes modulated upon an alternating current wave of the above-mentioned frequency will be produced.

Transformer 13 is arranged with terminals 14, 15, 16 for outputs of .924E, .707E, .383E, respectively, and an upper terminal 17 and a lower terminal 19. One lead to evaluator C is directly connected to terminal 14. The other lead to evaluator C is connected to armature 20 operated by relay 18 which selects between terminals 15 and 17 connected to the outer front and outer back contacts, respectively, of relay 18. It is readily apparent that the circuitry between transformer 13 and evaluator C provides a set of voltages through the operation of relay 18, and these voltages are employed by the evaluator as the slope voltages.

Evaluator D of the decoder has two input leads with one lead connected directly to terminal 16 of transformer 13. The remaining lead is directly connected to armature 21 of relay 18 which selects between terminals 19 and 15 connected to the inner back and inner front contacts, respectively, of relay 18. The circuitry between transformer 13 and evaluator D, likewise, provides a set of voltages through the operation of relay 18. The range of slope voltages supplied to each evaluator are as follows for the indicated contact condition.

| Contacts | Evaluator C | Evaluator D |
|---|---|---|
| Back (normally closed) | E-.924E | .383E-0 |
| Front (normally open) | .924-.707E | .707E-.383E |

Figure 2:
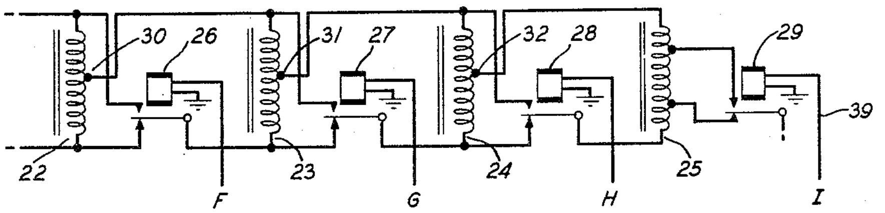
Fig. 2 is a circuit diagram of an evaluator forming a part of the converter of Fig. 1.

Evaluators C and D are identical and are arranged as indicated in Fig. 2, which is a circuit diagram for a representative evaluator, except that a different set of slope voltages is supplied to each evaluator as previously mentioned. Each evaluator comprises four autotransformers 22, 23, 24, 25, which are normally connected in tandem through the back contacts of transfer relays 26, 27, 28 and 29, each of these transformers being arranged to halve the input voltage for application to the next succeeding transformer. The center taps 30, 31, and 32 of transformer 22, 23, and 24, respectively, are connected to the upper terminals of the windings of the next succeeding transformer.

The upper terminals of the windings of autotransformers 22, 23 and 24 are, respectively, connected to the front contacts of relays 26, 27 and 28. These relays when operated connect the upper terminal of the winding of one transformer to the lower terminal of the winding of the next succeeding transformer. The voltage selected by relay 28 is applied to output transformer 25 tapped at the 75 percent and 25 percent points, and output relay 29 selects which of the output voltages so made available will be applied to lead 39.

As indicated in Fig. 1, leads 39*c* and 39*d* of the two evaluators are connected to both sets of contacts operated by relay 41. The back contacts of relay 41 connect evaluator C and D to output circuits B and A (indicated in Fig. 1 by the dashed line boxes), respectively, and the front contacts of the relay, when operated, connect evaluators C and D to output circuits A and B, respectively. Each of the output circuits A and B contains a relay (44 and 45, respectively) having two sets of contacts through which voltages may be applied to the primary of a power transformer (46 and 47, respectively). Output circuits A and B operate similarly except that different code digits operate relays 44 and 45. Common lead 19 is connected to the outer back contact and inner front contact of relay 45 and the outer front and inner back contacts of relay 44. The outer front contact and the inner back contact of relay 45 and the outer back and inner front contacts of relay 44 are connected to armatures 42 and 43, respectively. Power transformers 46 and 47 each comprise a main primary winding 46–1 and 47–1, respectively, and a compensating winding 46–2 and 47–2, respectively. The function of the compensating windings will be described in more detail hereinafter. Windings 46–1 and 47–2 are connected subtractively in series whereas windings 47–1 and 46–2 are connected additively in series. The marked leads of windings 46–1 and 47–2 are connected to the outer and inner armatures of relay 44, respectively The unmarked and marked leads of windings 47–1 and 46–2, respectively, are connected to the inner and outer armatures of relay 45. The secondaries of transformers 46 and 47 supply output voltages $E_A$ and $E_B$, respectively.

For the operation of three phase synchros, which are more common, power transformers 48 and 49 are added. The primaries of transformers 48 and 49 are connected to the secondaries of transformers 46 and 47, respectively. The secondaries of transformers 48 and 49 are interconnected to provide three suitable voltages for synchro operation. The rotor of the synchro is connected to source 12 through power transformer 50 which produces the proper voltage required by the rotor.

Figure 3:
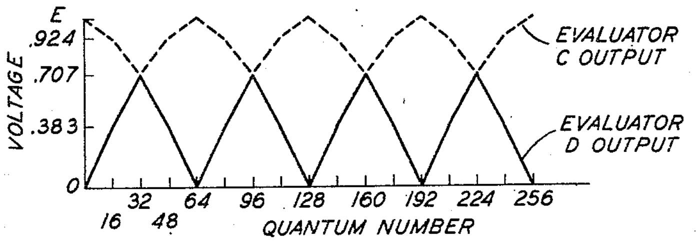
Fig. 3 is a graph of the output voltages of the evaluators one of which is shown in Fig. 2 with voltage plotted as the ordinate and code group sequences indicated in quanta as the abscissa.
Figure 4:
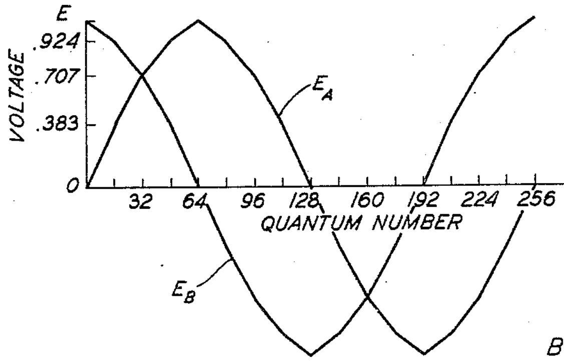
Fig. 4 is a graph of the output circuit voltages of Fig. 1 plotted with voltage as the ordinate and code group sequences indicated in quanta as the abscissa.

A source of potential 12 energizes transformer 13, and in turn each evaluator is energized by the fixed connection to transformer 13 and the connection through the contacts operated by relay 18 to transformer 13. Relay 18 is operated to provide the appropriate slope voltage to the evaluators C and D. The converter indicated in Fig. 1 approximates a sinusoid with four slope voltages in each quadrant of the sinusoid; therefore, relay 18 supplies, when in the unoperated condition, a range of voltages of (E through .924E) and (.383E through 0) to evaluators C and D, respectively, and when energized supplies a range of voltages of (.924E through .707E) and (.707E through .383E) to evaluators C and D, respectively. The evaluators effectively modulate the applied voltage as a result of connections selectively established in response to the code by relays 26, 27, 28, and 29. As will be further explained hereinafter, the sequence of operation of the relays in response to progressive code groups representing progressively changing shaft positions, i. e., rotation, is such that the envelope of the evaluator output voltage linearly increases or decreases along a slope as illustrated in Fig. 3. The dotted lines of Fig. 3 indicate the magnitude of the voltage envelope produced by evaluator C for each code group identified by the corresponding quantum number. The solid lines of Fig. 3 indicate the magnitude of the voltage envelope produced by evaluator D for the same code group. The two output voltages developed by evaluators C and D are distributed through the operation of relay 41 to supply the output circuits with approximated half cycle sine-shaped voltage envelopes. The envelopes are relatively displaced by 90 degrees as indicated in Fig. 4. Output circuit A reverses the polarity of the applied voltage at the 128th quantum or mid-point in the range representable by the code with relay 44 interchanging the common lead and the applied voltage. Output circuit B reverses the polarity of the mid-point voltage at the 64th and 192nd quanta or one quarter and three quarter points, respectively, in the range with relay 45 interchanging the common lead and the applied voltage. The voltage envelopes supplied to power transformers 46 and 47 are thus approximate sinusoids and are displaced 90 degrees.

The voltages $E_A$ and $E_B$ from output circuits A and B, respectively, are suitable for two phase synchro operation and, as shown in this embodiment, with the addition of power transformers 48 and 49, voltages suitable for three phase synchro operation can also be made available. Voltage $E_A$ and $E_B$, the approximate sinusoids displaced 90 degrees are applied to the primaries of transformers 48 and 49, respectively. The secondaries of transformers 48 and 49 are suitably interconnected by the well known Scott connection to provide a three phase source for the synchro stator. The synchro rotor is excited with suitable voltage from the same primary source as was employed to excite the converter. The three output voltages of the converter occur in space phase but produce an alternating flux in the synchro stator, as discussed above. The excitation of the rotor likewise produces an alternating flux in the rotor. The interaction of these two fluxes results in a torque which causes the rotor to rotate to a position in which the axis of both fluxes are in parallel and aiding. Such a force is at a maximum when the axis of the two fluxes are 90 degrees apart.

As has been stated above, the analog converter of the invention is intended to accept digital information encoded in the reflected binary or Gray code. This code differs from the orthodox binary code by virtue of a rearrangement of the pulses of the various code groups in such a manner that the sequence of "on" and "off" pulses which form a code group representing a particular signal amplitude differs in only one code element from each of the sequences representing the next lower and the higher amplitudes.

A reflection process is employed to construct the code from the one digit orthodox binary system. The two binary symbols (0 and 1) are tabulated in columnar fashion and a horizontal line termed the reflection line is drawn beneath the last symbol. The upper part of the table is placed below the line in reverse fashion, that is, the last digit is placed first and the first is placed last. The tabulation will now differ in not more than one digit, but the first is identical with the fourth and the second with the third. A second digit is added to the left of each symbol in order that each symbol may be unique and differ from the next above and below it in not more than one digit. The second digit of the code groups above the line should be one of the two binary symbols while the second digit of those below the line should be the remaining binary symbol. The array now represents the first four numbers in the primary two digit reflected binary number system. It is evident that the number of code digits may be increased and each column will be cyclic in nature since the code is built up by the reflection process.

A decoded value may be derived for each code group if each digit is weighted in accordance with the procedure outlined in F. Gray Patent 2,632,058, issued March 17, 1953. It may be seen from the method of "building up" the Gray code that after all sequences of an n-digit code have been completed a more significant digit may be added by drawing a reflection line immediately after the last sequence of the n-digit code and repeating the sequences below the line in reverse order. The more significant digit is added to the left of the code sequences above and below the reflection line by choosing one of the two binary symbols for sequences above the line and placing the remaining binary symbol to the left of those sequences below the line. The reflection process as applied to the less significant digit permits each column to start from zero and go to a maximum and then return to zero over the entire code sequence for the $n+1$ digit code. The more significant digit will start from zero and go to a maximum only for the entire code sequences of the $n+1$ digit code. This particular characteristic of all code digits except the most significant in counting up to a maximum and then down to zero is especially advantageous for use in the synthesis of the cyclic analog voltages required as the output of the converter. The linearly modulated slope voltages are combined to approximate sinusoidal voltages thus eliminating the need to reconstruct each amplitude by storing and weighting each element of a code group. It is apparent that such an approximate method of reconstruction of the analog signal is not as accurate as the usual methods employed for decoding binary codes. However, as pointed out above, the available accuracy is more than sufficient to match that of the resolver or other synchro output device. On the other hand, the method produces a significant reduction in the quantity and complexity of equipment required.

It will be recalled that the converter of the invention is arranged to receive Gray code and produce an analog (decoded) output. As taught in the Gray Patent 2,632,058 such a code may be evaluated by weighting according to the relationship $W=(2^d-1)(-1)^s$ and adding the result for the several digits. In the foregoing relationship $d$ represents the digit number of the code symbol and $s$ is the number of non-zero digits in the symbol with digit numbers greater than $d$. The Gray method of evaluation requires relatively complicated circuitry and is undesirable where, as in the present arrangement simplification is the primary aim. One of the features of the present invention resides in the method employed to weight the code elements as received. Thus, although Gray code is received, the tandem arrangement of transformer 22, 23, 24, 25, shown in Fig. 2, effectively weights the several code digits in proportion to $2^d$, the normal binary proportion of evaluation, since each transformer halves the applied voltage. Table I indicates the value that would be developed for each code group without the additional operations performed in the evaluation process.

*Table I*

| $2^3$ | $2^2$ | $2^1$ | $2^0$ | Number |
|---|---|---|---|---|
| 0 | 0 | 0 | 0 | 0 |
| 0 | 0 | 0 | 1 | 1 |
| 0 | 0 | 1 | 1 | 3 |
| 0 | 0 | 1 | 0 | 2 |
| 0 | 1 | 1 | 0 | 6 |
| 0 | 1 | 1 | 1 | 7 |
| 0 | 1 | 0 | 1 | 5 |
| 0 | 1 | 0 | 0 | 4 |
| 1 | 1 | 0 | 0 | 12 |
| 1 | 1 | 0 | 1 | 13 |
| 1 | 1 | 1 | 1 | 15 |
| 1 | 1 | 1 | 0 | 14 |
| 1 | 0 | 1 | 0 | 10 |
| 1 | 0 | 1 | 1 | 11 |
| 1 | 0 | 0 | 1 | 9 |
| 1 | 0 | 0 | 0 | 8 |

Relays 26, 27, and 28 indicated in Fig. 2 select between the upper and lower terminals of their associated transformer, and the selection process is equivalent to adding or subtracting voltage from the mid-point voltage of the associated transformer. The addition or subtraction function can be represented by $(-1)^s$ as shown in the procedure described above for evaluating Gray code.

Table II is a weighting chart with the binary weighting proportion multiplied by $-1^s$, and it indicates the values that would be developed by weighting the received groups as proposed.

*Table II*

| $(2^3)(-1^s)$ | $(2^2)(-1^s)$ | $(2^1)(-1^s)$ | $(2^0)(-1^s)$ | Value |
|---|---|---|---|---|
| 0 | 0 | 0 | 0 | 0 |
| 0 | 0 | 0 | 1 | 1 |
| 0 | 0 | 1 | 1 | 1 |
| 0 | 0 | 1 | 0 | 2 |
| 0 | 1 | 1 | 0 | 2 |
| 0 | 1 | 1 | 1 | 3 |
| 0 | 1 | 0 | 1 | 3 |
| 0 | 1 | 0 | 0 | 4 |
| 1 | 1 | 0 | 0 | 4 |
| 1 | 1 | 0 | 1 | 5 |
| 1 | 1 | 1 | 1 | 5 |
| 1 | 1 | 1 | 0 | 6 |
| 1 | 0 | 1 | 0 | 6 |
| 1 | 0 | 1 | 1 | 7 |
| 1 | 0 | 0 | 1 | 7 |
| 1 | 0 | 0 | 0 | 8 |

It is evident from Table II that the range of variation of the selected slope voltage along a predetermined slope is improved over that shown in Table I, but the obvious ambiguity of a double shift in output every other quantum may be eliminated by the final step of what is termed residual voltage addition or subtraction. The output transformer 25 disclosed in Fig. 2 is tapped at the one-quarter and three-quarter points so that a voltage corresponding to a half quantum may be added to or subtracted from the voltage applied to transformer 25. Relay 29 selects between the one-quarter and three-quarter taps of transformer 25 and the selection process is equivalent to multiplying the selected tap by the function $(-1)^s$ which has been previously described. It may be observed from Figs. 1 and 2 that transformer 25 and relay 29 provide a continuous or residual voltage of one-quarter or three-quarter volts for "off" and "on" pulses, respectively, and when the residual voltages multiplied by $(-1)^s$ are combined with the voltages developed by the weighting of the other evaluator code digits, a half quantum shift is developed between successive quantums instead of a full quantum. The half quantum shift between successive quanta produces a continuous range of variation of the selected slope voltage along a predetermined slope.

Table III is a weighting chart identical with Table II except the least significant digit is weighted one-quarter volt for "off" pulses and three-quarter volt for "on" pulses, and both of these values are multiplied by $(-1)^s$ to develop the proper residual voltage for combination with the other values of the code group simultaneously being weighted in the decoder.

*Table III*

| $(2^3)(-1^s)$ | $(2^2)(-1^s)$ | $(2^1)(-1^s)$ | $(2^{-2})(-1^s)=\frac{1}{4}$ | $(3)(2^{-2})(-1^s)=\frac{3}{4}$ | Value |
|---|---|---|---|---|---|
| 0 | 0 | 0 | $+\frac{1}{4}$ | ---------- | $\frac{1}{4}$ |
| 0 | 0 | 0 | ---------- | $+\frac{3}{4}$ | $\frac{3}{4}$ |
| 0 | 0 | 1 | ---------- | $-\frac{3}{4}$ | $1\frac{1}{4}$ |
| 0 | 0 | 1 | $-\frac{1}{4}$ | ---------- | $1\frac{3}{4}$ |
| 0 | 1 | 1 | $+\frac{1}{4}$ | ---------- | $2\frac{1}{4}$ |
| 0 | 1 | 1 | ---------- | $+\frac{3}{4}$ | $2\frac{3}{4}$ |
| 0 | 1 | 0 | ---------- | $-\frac{3}{4}$ | $3\frac{1}{4}$ |
| 0 | 1 | 0 | $-\frac{1}{4}$ | ---------- | $3\frac{3}{4}$ |
| 1 | 1 | 0 | $+\frac{1}{4}$ | ---------- | $4\frac{1}{4}$ |
| 1 | 1 | 0 | ---------- | $+\frac{3}{4}$ | $4\frac{3}{4}$ |
| 1 | 1 | 1 | ---------- | $-\frac{3}{4}$ | $5\frac{1}{4}$ |
| 1 | 1 | 1 | $-\frac{1}{4}$ | ---------- | $5\frac{3}{4}$ |
| 1 | 0 | 1 | $+\frac{1}{4}$ | ---------- | $6\frac{1}{4}$ |
| 1 | 0 | 1 | ---------- | $+\frac{3}{4}$ | $6\frac{3}{4}$ |
| 1 | 0 | 0 | ---------- | $-\frac{3}{4}$ | $7\frac{1}{4}$ |
| 1 | 0 | 0 | $-\frac{1}{4}$ | ---------- | $7\frac{3}{4}$ |

The residual voltages continuously developed by evaluators C and D introduce an error between the transmitter and synchro receiver. This is constant, however, and may easily be eliminated. Thus, compensating windings 46–2 and 47–2 placed on the primaries of power transformers 46 and 47 develop voltages equal to the residual voltage, and the addition or subtraction of this voltage to the opposite evaluator output eliminates the discrepancy between the transmitter and the synchro receiver.

It should be noted that the Gray method of decoding produces values for every code group which differ from those given in Table III (corrected by the residual voltage addition or subtraction) by a factor of $2^1$. This variation arises from the fact that the base 2 is raised to $2^d$ in the case of the Gray code while the base 2 is raised to $2^{d-1}$ in the case of Table III.

As each code group is received, relay 18 selects the slope voltage supplied to each evaluator which linearly modulates the voltage along a slope in response to the code groups supplied to the evaluator. Commencing from 000000000 which is the initial code group or the first quantum of the Gray code, relay 18 is operated on the 17th quantum and changes state after every 32 successive quanta. At the 17th code group, relay 18 changes the slope voltage to each evaluator and exchanges leads connected to the higher potential for each evaluator. During the first 16 quanta, the evaluator output increases in proportion to Table III by uniform addition to the applied potential on the lower terminal of each evaluator. Normally, the output should thereafter return to quantum one in reverse order by uniform subtraction from the upper terminal of each evaluator; however, relay 18 interchanges the higher potential on the evaluator input leads with the result that the subtraction cycle of the evaluator adds to the lower terminal voltage producing a continuous increase for 32 successive quanta instead of an increase for only 16 quanta. At the 49th quantum, relay 18 releases to change the slope voltage to each evaluator and exchange leads connected to the higher potential for each evaluator, and the above process is completed in reverse fashion. As a result, evaluator C modulates the applied slope voltage from E to .707E then back to E in 64 quanta while in the same period evaluator D modulates the applied slope voltage from 0 to .707E to zero. It is evident from the above and Fig. 3 that the evaluators are one quantum apart at the 32nd quantum and the operation of relay 41 on the 33rd quantum permits the interchange of evaluator outputs to produce a one quantum shift in each output circuit, and as the code progresses output circuits A and B are presented with two approximate half cycle sinusoids in 128 quanta the sinusoid produced by evaluator C being ninety degrees ahead of the sinusoid produced by evaluator D. Relays 44 and 45 produce inversion of the half cycle sinusoids applied to power transformers 46 and 47, respectively at the moment each sinusoid reaches zero or every 128 quanta. The sine-cosine voltage envelopes appearing at transformers 46 and 47 represent the power frequency of source 12 modulated to approximate sinusoids by the operation of the eight relays of the converter in response to the code digits, and the transformer action of transformers 48 and 49 permits the combination of modulated signals to produce the required number of phases for synchro device operation.

The operation of the evaluators disclosed in Fig. 2 may be further explained by arbitrarily selecting a code group 1011 for application to the relays of Fig. 2 and applying an input voltage of 8 volts amplitude to transformer 22. For reference purposes, the upper end of the winding of transformer 22 will be assumed to be at a potential of 8 volts and the lower end will be assumed to be at zero potential. The numeral one of the code group indicates "on" pulses and the presence of an "on" pulse results in the operation of the corresponding relay. The numeral zero indicates "off" pulses which do not produce operation of the corresponding relay. The first digit of the code group reading from left to right is the most significant and it is applied to relay 26. The next successive digits of the code group are correlated individually to the following consecutive relays of the evaluators.

The voltage input to transformer 23 is obtained through the front contact of relay 26 and the center-tap on transformer 22 since relay 26 is energized. The voltage input to transformer 24 is obtained through the back contact of relay 27 and the center-tap on transformer 23 since relay 27 is de-energized. The voltage input to transformer 25 is obtained through the front contact of relay 28 and the center-tap on transformer 24 since relay 27 is energized. The output voltage appears on the front contact of relay 29 since that relay is energized.

The settings of the relays 26 and 27 connect together the lower end of the winding of transformer 24 and the upper end of the winding of transformer 22 at the same potential of 8 volts. The upper end of the winding of transformer 24 and its center-tap are at 6 and 7 volts, respectively as a result of the center-tap connections among transformers 22, 23, and 24. The upper end of the winding of transformer 24 and the lower end of the winding of transformer 25 are at 6 volts by the connection formed from the setting of relay 28. The upper end of the winding of transformer 25 is at 7 volts potential since it is connected to the center-tap of transformer 24. The output voltage appearing on lead 39 is 6¾ volts since the setting of relay 29 selects ¾ of the difference between the potentials on the upper and lower ends of the winding of transformer 25.

If the next code group applied to the evaluator relays is 1001, then all relays except relay 26 and relay 29 are returned to their "off" condition. The upper end of the winding of transformer 22 and the lower end of the winding of transformer 25 are connected together at 8 volts potential. The upper end of the winding of transformers 23, 24, and 25 are 4, 6, and 7 volts potential, respectively. The output voltage appearing on lead 39 is 7¼ volts since relay 29 selects ¼ of the difference between the potentials on the upper and lower ends of the winding of transformer 25.

It should be remembered that the invention is not limited to the converter in the described embodiment. The invention is capable of producing converters with more or less than four straight line segments or slopes per quadrant of a sinusoid according to the quantity of the most significant code digits employed for selecting the number and polarity of slope voltages. Likewise, the quantity of evaluation points may be varied by changing the number of remaining code digits which are supplied to the evaluators. Thus, any code group comprises two subgroups of digits, and each subgroup individually may be increased or decreased to produce a converter having the desired number of slopes with the proper number of evaluation points or quantizing interval on a slope. The subgroup of digits comprising the more significant digits controls the number and polarity of the slopes while the remaining subgroup controls the quantizing interval of the evaluators.

As an example, a one slope converter would require only two digits for slope generation purposes since the evaluators may be directly connected to the proper taps on transformer 13, eliminating relay 18. There would be no requirement to combine evaluator outputs to obtain two slopes since only one slope would be required, and consequently, relay 41 could be eliminated from the converter. The polarity of the voltages, however, would require changing and a digit would be required for each evaluator. A two slope converter would require three digits, for slope generation purposes, since evaluator outputs must be combined. An eight slope evaluator would require five digits for slope generation purposes since another relay would be required in conjunction with relay 18 to select the voltages for the evaluators.

It can be shown that the number of slopes desired for a converter is related to the number of code elements or digits in the more significant subgroup by the relationship $y=2+\log_2 x$, where $x$ is the number of slopes and $y$ is the number of code digits in the more significant subgroup. The relationship may be verified by substituting for $x$ and comparing the solutions with the converters described above.

It is a simpler process to vary the quantizing interval of the evaluators since it is only necessary that a transformer and associated switching means be added to or subtracted from the tandem arrangement of an evaluator for each digit subtracted from or added to the other subgroup of digits included in a code group. The complexity of the converter, however, increases directly with the number of slopes desired, and for the sake of simplicity it may be desirable to increase the accuracy of a converter by increasing the quantizing interval rather than increasing the number of slopes per quadrant of the sinusoidal envelopes.

What is claimed is:

1. A pulse converter for decoding successive code groups of $n$-digits transmitted according to the reflected binary code to represent the successive angular positions of a rotating shaft and simultaneously producing at least two alternating current voltages having envelopes approximating sinusoidal form by a selected number of straight line segments comprising, a source of alternating current of the desired frequency, means for distributing the $n$-digits of a received code group for simultaneous occurrence in separate channels corresponding respectively to the individual digits of the code, means responsive to variations of the $$\left(\frac{n}{2}+1\right)\text{th}$$

digit of the code in order of increasing significance for selecting from said source voltage levels corresponding to segments to be generated, at least two evaluator means each responsive to the $$\frac{n}{2}$$

least significant digits of the code for accepting the selected voltage and producing outputs the envelopes of which lie along linear segments including said selected voltage levels and means responsive to the successive variations of the remaining code digits of said $n$-digit code for combining said straight line segments to approximate at least two sinusoids.

2. A pulse converter for decoding $n$-digit code groups transmitted according to the reflected binary code and simultaneously producing output voltages which comprise alternating current voltages of envelope levels determined by said code and falling along a selected number of straight line segments rather than a continuous range of values comprising, a source of alternating current of a desired frequency, voltage dividing means for producing from said source a plurality of voltages of amplitudes related to said segments, means for distributing the $n$-digits of a received code group for simultaneous occurrence in separate channels corresponding respectively to the individual digits of the code, means responsive to the $$\left(\frac{n}{2}+1\right)\text{th}$$

digit of the code in order of increasing significance for selecting from said divider a voltage corresponding to the segment to be generated, at least two evaluation means each responsive to the $$\frac{n}{2}$$

least significant digits of said code for producing from said selected voltage an output which lies along a linear slope including said voltage and all other possible outputs corresponding to the possible combinations of said $$\frac{n}{2}$$

least significant digits and means responsive to the remaining digits of said code for combining the outputs from said evaluators to develop instantaneous values corresponding to the received code groups.

3. In a remote indication system, a pulse converter for decoding $n$-digit code groups transmitted according to the reflected binary code and simultaneously producing outputs for operation of a synchro device which comprises alternating current voltages of envelope levels determined by said code and falling along a selected number of straight line segments rather than a continuous range of values, a source of alternating current of the frequency required for operation of said synchro device, means for distributing the $n$-digits of a received code group for simultaneous occurrence in separate channels corresponding respectively to the individual digits of the code, voltage dividing means for producing from said source a plurality of selected voltage amplitudes, means responsive to the $$\frac{n}{2}+1$$

least significant digits of said code for selecting from said dividers at least two voltages and producing outputs from said selected voltages which lie along linear slopes including said voltages, said slopes alternately increasing and decreasing in response to all successive variations of the $$\frac{n}{2}+1$$

least significant digits of said $n$-digit code, means responsive to the remaining digits of said code for combining said outputs for application to said synchro device.

4. A pulse converter for decoding successive code groups of $n$-digits transmitted according to the reflected binary code to represent the successive angular positions of a rotating shaft and simultaneously producing at least two alternating current voltages having envelopes approximating sinusoidal form by a selected number of straight line segments comprising, a source of alternating current of the desired frequency, means for distributing the $n$-digits of a received code group for simultaneous occurrence in separate channels corresponding respectively to the individual digits of the code, said source directly supplying an autotransformer having a tapped winding, means responsive to the $$\left(\frac{n}{2}+1\right)\text{th}$$

digit of the code in order of increasing significance for selecting between taps on said winding voltage levels corresponding to segments to be generated, at least two evaluation means each responsive to the $$\frac{n}{2}$$

least significant digits of said code for accepting said selected voltage and producing outputs the envelopes of which lie along linear segments including said voltage, and means responsive to the successive variations of the remaining digits of said code for combining said straight line segments to approximate at least two sinusoids.

5. In a remote indication system, wherein information is transmitted by $n$-digit reflected binary code, a pulse converter for decoding $n$-digit code groups and simultaneously producing outputs for operation of a synchro device which comprise alternating current voltages of envelope levels determined by said curve and falling along a selected number of straight line segments rather than a continuous range of values comprising, means for distributing the $n$-digits of a received code group for simultaneous occurrence in separate channels corresponding respectively to the individual digits of the code, a source of alternating current of the frequency required by said synchro devices, said source directly supplying an autotransformer having a tapped winding, an evaluator comprising an output autotransformer having the winding tapped to the one-quarter and three-quarter points, means responsive to the least significant code digit for selecting one of the taps of said transformer, individual transformers for each of the second through $$\frac{n}{2}$$

more significant code digits and each arranged to halve input voltages applied thereto, switching means for each transformer and associated with said channels to be responsive to the corresponding digit for selecting between the two parts of the applied voltages as an output from each of the respective transformers for application to the input of the next successive transformer, a second evaluator identical with the first and responsive to the same code digits but receiving different input voltages, means responsive to the $$\left(\frac{n}{2}+1\right)\text{th}$$

digit of the code in order of increasing significance for selecting the input voltages for each evaluator from the tapped winding of said autotransformer, and means operated by the remaining digits of the code for combining the outputs from the output transformers of said evaluators with the proper polarity to develop two voltages for application to said synchro device to reproduce the angular position of a remote synchro device represented by the received $n$-digit code group.

6. A pulse converter for decoding successive code groups of $n$-digits transmitted according to the reflected binary code to represent the successive angular positions of a rotating shaft and simultaneously producing at least two alternating current voltages having envelopes approximating sinusoidal form by a selected number of straight line segments comprising, means for distributing the $n$-digits of a received code group for simultaneous occurrence, a source of alternating current of the desired frequency, said source directly supplying an autotransformer having a winding tapped at points 38.3%, 70.7%, and 92.4% of the full winding, a first relay responsive to the $$\left(\frac{n}{2}+1\right)\text{th}$$

digit of the code in order of increasing significance for having two sets of contacts with the full and zero windings of said autotransformer connected to the outer and inner back contacts respectively of said first relay and the outer and inner front contacts of said first relay connected to the 70.7% tap of said autotransformer, a first evaluator connected between the 92.4% tap of said autotransformer and the armature of the outer contact operated by said first relay, a second evaluator connected between the 38.3% tap of said autotransformer and the armature of the inner contacts operated by said first relay, said evaluators being identical in operation and each responsive to the $$\frac{n}{2}$$

least significant digit of said code for accepting the selected voltage and producing outputs the envelopes of which lie along a linear segment including said selected voltage levels, and means responsive to the successive variations of the remaining digits of said code for combining said straight line segments to approximate at least two sinusoids in time quadrature.

7. A pulse converter for decoding successive code groups of $n$-digits transmitted according to the reflected binary code to represent the successive angular positions of a rotating shaft and simultaneously producing at least two alternating current voltages having envelopes approximating sinusoidal form by a selected number of straight line segments comprising, a source of alternating current of the desired frequency, voltage divider means for producing from said source a plurality of voltages of amplitudes related to said segments, means responsive to the $$\left(\frac{n}{2}+1\right)\text{th}$$

digit of the code in order of increasing significance for selecting from said divider voltages corresponding to the segments to be generated, a first evaluator for accepting said selected voltages comprising an output autotransformer having a winding tapped at the one-quarter and three-quarter points, means responsive to the least significant code digit for selecting as an output circuit one of the taps of said output transformer, individual transformers for each of the second through $$\frac{n}{2}\text{th}$$

digits of the code arranged to halve voltages applied thereto, switching means for each transformer responsive to the corresponding digit for selecting between the two parts of the applied voltages as an output from the respective transformer for application to the input of the next successive transformer, a second evaluator identical with the first and responsive to the same code digits but accepting different selected voltages, and means responsive to the successive operations of the remaining digits of said code for combining the outputs from said evaluators to develop instantaneous values falling along approximate sinusoids occurring in time quadrature.

8. A pulse converter for decoding $n$-digit code groups transmitted according to the reflected binary code and simultaneously producing output voltages which comprise alternating current voltages of envelope levels determined by said code and falling along a selected number of straight line segments rather than a continuous range of values comprising, means for distributing the $n$-digits of a received code group for simultaneous occurrence in separate channels corresponding respectively to the individual digits of the code, sources of alternating current voltages of a desired frequency and of amplitudes related to said segments, means responsive to the $$\left(\frac{n}{2}+1\right)\text{th}$$

digit of the code in order of increasing significance for selecting voltages from said sources corresponding to the segments to be generated, at least two evaluators each comprising voltage divider means for accepting the selected voltages and producing two equal voltages each half of the selected voltage, said equal voltages being of opposite polarity, switching means responsive to the $$\frac{n}{2}\text{th}$$

digit of the code for selecting between said equal voltages, additional dividing and associated switching means corresponding respectively to the remaining digits of the code of lesser significance than the $$\frac{n}{2}\text{th}$$

digit and including all but the least significant, said dividing and switching means in succession being arranged to select the output of the divider corresponding to the next more significant digit, output divider means arranged to accept the selected voltage from the last of said dividing means and to produce as outputs two voltages of one-quarter of the applied voltage and opposite polarity, switching means associated with said output divider, means responsive to the least significant digit for selecting between the output divider voltages as the evaluator outputs, and means responsive to the remaining digits of said code for combining the outputs of said evaluators to develop instantaneous value corresponding to the received code group.

9. A pulse converter for decoding $n$-digit code groups transmitted according to the reflected binary code and simultaneously producing output voltages which comprise alternating voltages of envelope levels determined by said code and falling along a selected number of straight line segments rather than a continuous range of values comprising, means for distributing the $n$-digits of a received code group for simultaneous occurrence in separate channels corresponding respectively to the individual digits of the code, a source of alternating current of a desired frequency, voltage divider means for producing from said source a plurality of voltages of amplitudes related to said segments, means responsive to the $$\left(\frac{n}{2}+1\right)\text{th}$$

digit of the code in order of increasing significance for selecting from said divider a voltage corresponding to a segment to be generated, a first and second evaluator each responsive to the $$\frac{n}{2}$$

least significant digit of said code for producing from said selected voltage an output which lies along a linear slope including said voltage and all other possible outputs corresponding to the possible combinations of said $$\frac{n}{2}$$

least significant digits, means responsive to the $$\left(\frac{n}{2}+2\right)\text{th}$$

digit for selecting an output circuit as the sole load for each evaluator, and output circuit means responsive to the remaining code digit for receiving evaluator outputs and properly reversing polarities of said outputs to develop instantaneous values corresponding to the received code group.

10. A pulse converter for decoding successive code groups of $n$-digits transmitted according to the reflected binary code to represent the successive angular positions of a rotating shaft and simultaneously producing at least two alternating current voltages having envelopes approximating sinusoidal form by a selected number of straight line segments comprising, means for distributing the $n$-digits of a received code group for simultaneous occurrence in separate channels corresponding respectively to the individual digits of the code, a source of alternating current of the desired frequency, voltage divider means for producing from said source a plurality of voltages of amplitudes related to said segments, means responsive to the $$\left(\frac{n}{2}+1\right)\text{th}$$

digit of the code in order of increasing significance for selecting from said divider a voltage corresponding to the segment to be generated, a first and second evaluator each responsive to the $$\frac{n}{2}$$

least significant digits of said code for accepting said selected voltage levels and producing outputs with respect to a voltage reference level the envelopes of which lie along straight line segments including said selected voltage level, a selecting relay having two sets of contacts and responsive to the $$\left(\frac{n}{2}+2\right)\text{th}$$

digit, outer front and inner back contacts of said selecting relay connected to the first evaluator, outer back and inner front contacts of said selecting relay connected to the second evaluator, inner and outer armatures of said selecting relays choosing between evaluator outputs for reversing relays, a first reversing relay responsive to the most significant code digit and having two sets of contacts, outer front and inner back contacts of said first reversing relays connected to the inner armature of said selecting relay, and a second reversing relay responsive to the remaining code digit and having two sets of contacts, outer front and inner back contacts of said second reversing relay connected to the outer armature of said selecting relay, outer back and inner front contacts of both first and second reversing relays connected to said voltage reference level on said dividing means, inner and outer armatures of both first and second reversing relays connected to output circuit means for combining said straight line segments to produce at least two alternating current voltages having envelopes approximating sinusoidal form which are in time quadrature.

11. A pulse converter for decoding successive code groups of $n$-digits transmitted according to the reflected binary code to represent the successive angular positions of a rotating shaft and simultaneously producing at least two alternating current voltages having envelopes approximating sinusoidal form by a selected number of straight line segments for operating a synchro device comprising, a source of alternating current of a frequency required by said synchro devices, voltage dividing means for producing from said source a plurality of voltages of amplitudes related to said segments, means for distributing the $n$-digits of a received code group for simultaneous occurrence in separate channels corresponding respectively to the individual digits of the code, means responsive to the $$\left(\frac{n}{2}+1\right)\text{th}$$

digit of the code in order of increasing significance for selecting from said divider a voltage corresponding to the segment to be generated, at least two evaluation means each responsive to the $$\frac{n}{2}$$

least significant digits of said code for accepting the selected voltage and producing outputs the envelopes of which lie along linear segments including said selected voltage levels, means responsive to the successive variations of the $$\left(\frac{n}{2}+2\right)\text{th}$$

code digit in order of increasing significance for receiving and combining the outputs of said evaluators to develop instantaneous values falling along half cycle sinusoids in time quadrature, means responsive to the successive variations of the remaining code digits for receiving the instantaneous values falling along the half cycle sinusoids and properly reversing the polarities thereof to develop instantaneous values falling along two full cycle sinusoids occurring in quadrature and means for receiving the instantaneous values falling along the full cycle sinusoids comprising at least two power transformers each having a first and second primary winding and one secondary winding, each transformer having the first primary connected to the second primary of the other transformer, the secondary windings of each power transformer being directly connected to means for producing sufficient sinusoidally shaped voltages for generating motor action in a directly connected synchro device.

12. Apparatus for receiving and decoding an incoming sequence of code pulses which pulses are arranged in accordance with the reflected binary code, comprising means for weighting all pulses except the least significant in proportion to $(-1)^s(2^n)$ where $n$ is the digit number of the digit with which the pulse position is correlated and $s$ is the number of "on" pulses in said code pulse groups having digit numbers greater than $n$, the code value of each "off" pulse being zero, means for weighting the least significant digit in proportion to $(2^{-2})(-1^s)$ for "off" pulses and $(3)(2^{-2})(-1^s)$ for "on" pulses, the code value of each entire pulse group being the sum of the individual code values of the several pulses of said group, and means for applying the sums of the weighted values to a reproducer.

13. Apparatus for receiving and decoding an incoming sequence of code pulse groups in each of which pulses are arranged in accordance with the reflected binary code comprising, individual autotransformers for each of the second through the most significant code digits and each arranged to halve the input voltage applied thereto, switching means for each transformer responsive to the corresponding digit for selecting between the two parts of the applied voltage as an output from respective transformers for weighting in proportion to $(-1^s)(2^n)$ where $n$ is the digit number of the digit with which the pulse position is correlated and $s$ is the number of "on" pulses in said code group having digit numbers greater than $n$, and application to the input of the next successive transformer, means responsive to the least significant code digits to weight said digit $(2^{-2})(-1^s)$ for "off" pulses and $(3)(2^{-2})(-1^s)$ for "on" pulses where $s$ is the number of "on" pulses occurring for digits other than the least significant digit, the code value of each entire pulse group being the sum of the individual code values of the several pulses of said group with the value of "off" pulses being zero, and means for applying the weighted output of the last transformer to a reproducer.

14. A pulse converter for decoding $n$-digit code groups transmitted according to the reflected binary code and simultaneously producing output voltages which comprise alternating current voltages of envelope levels determined by said code and falling along a selected number of straight line segments rather than a continuous range of values, a source of alternating current of a desired frequency, voltage dividing means for producing from said source a plurality of amplitudes related to said segments, means for receiving the $n$ digits of a reflected code group and distributing said digits for simultaneous occurrence in parallel channels corresponding respectively to the individual digits of the code, means responsive to the $$\left(\frac{n}{2}+1\right)\text{th}$$

digit of the code in order of increasing significance for selecting from said divider a voltage corresponding to the segment to be generated, at least two evaluation means each responsive to the $$\frac{n}{2}$$

least significant code digits for producing from said selected voltage an output which lies along a linear slope including said voltage and all other possible outputs corresponding to the possible combination of said $$\frac{n}{2}$$

least significant code digits, means included in each evaluator to develop a residual voltage of half a quantum voltage for correcting ambiguities in the decoding of digits supplied to said evaluator, a quantum voltage being the difference between successive outputs, and means responsive to the remaining code digits for combining the outputs from said evaluator and removing said residual voltages to develop instantaneous values corresponding to the received code group.

15. A pulse converter for simultaneously decoding and synthesizing multiphase approximated sinusoid voltages suitable for operation of alternating current synchro devices with the approximated sinusoid voltages composed of straight line segments each representing a continuous range of amplitudes encoded at a transmitter, comprising a source of alternating current of the frequency required for operation of said synchro device, means for receiving the $n$ digits of a reflected binary code group and simultaneously distributing the code group in parallel channels corresponding respectively to the individual digits of the code, means for selectively modulating said alternating current power supply by weighting all pulses except the least significant in proportion to $(-1)^s(2^n)$ where $n$ is the digit number of the digit with which the pulse position is correlated and $s$ is the number of "on" pulses in said code pulse groups having digits greater than $n$, the code value of each "off" pulse being zero, the least significant digit being weighted in proportion to $(2^{-2})(-1^s)$ for "off" pulses and $(3)(2^{-2})(-1^s)$ for "on" pulses, means for combining the weighted values to develop at least two approximated noncoincident sinusoid voltages whose amplitudes at any instant are proportional to the amplitude encoded at a transmitter, and means for combining said approximated sinusoids to produce the required number of phases for generating motor action in a directly connected synchro type device.

16. A pulse converter for simultaneously decoding and synthesizing multiphase approximated sinusoid voltages suitable for operation of alternating current synchro device with the approximated sinusoid voltages composed of straight line segments each representing a continuous range of amplitudes encoded at a transmitter, comprising a source of alternating current of the frequency required for operation of said synchro device, means for receiving the $n$ digits of a reflected binary code group and simultaneously distributing the code group in parallel channels corresponding respectively to the individual digits of the code, means for selectively modulating said alternating current power supply by the least significant code digits selecting one of two taps of an output transformer to weight said digit $(2^{-2})(-1^s)$ for "off" pulses and $(3)(2^{-2})(-1^s)$ for "on" pulses where $s$ is the number of pulses in said code groups having digits greater than the least significant digit with which the pulse position is correlated, the remaining digits being weighted in proportion to $(2^n)(-1^s)$ where $n$ is the digit number of the digit with which the pulse is correlated, means for combining the weighted values to develop at least two approximated noncoincident sinusoid voltages whose amplitudes at any instance are proportional to the amplitude encoded at a transmitter, and means for combining said approximated sinusoid to produce the required number of phases for generating motor action in a directly connected synchro type device.

17. A pulse converter for decoding $n$-digit code groups transmitted according to the reflected binary code and simultaneously producing output voltages which comprise alternating current voltages of envelope levels determined by said code and falling along a selected number of straight line segments rather than a continuous range of values comprising, means for distributing the $n$-digits of a received code group for simultaneous occurrence in separate channels corresponding respectively to the individual digits of the code, a source of alternating current of a desired frequency and having means for producing from said source a plurality of voltages of amplitudes related to said segments, means responsive to the $$\left(\frac{n}{2}+1\right)\text{th}$$

digit of the code in order of increasing significance for selecting voltages from said source corresponding to the segments to be generated, at least two evaluators each responsive to the $$\frac{n}{2}$$

least significant digits of said code for accepting said selected voltage levels and producing outputs which include a residual voltage of half a quantum voltage of proper polarity, a quantum voltage being the difference between successive evaluator outputs, the envelopes of said evaluator outputs lying along a linear slope including said voltage and all other possible outputs corresponding to the possible combination of said $$\frac{n}{2}$$

least significant digits, means responsive to the remaining digits of said code for combining outputs from said evaluator to develop instantaneous values to the received code group, and means for receiving said instantaneous values and developing voltages equal to said residual voltages for cancellation of said residual voltages included in said instantaneous values.

18. A pulse converter for decoding $n$-digit code group transmitted according to the reflected binary code and simultaneously producing output voltages which comprise alternating current voltages of envelope levels determined by said code and falling along a selected number of straight line segments rather than a continuous range of values comprising, a source of alternating current of a desired frequency, voltage dividing means for producing from said source a plurality of voltages of amplitude related to said segments, means for distributing the $n$-digits of a received code group for simultaneous occurrence in separate channels corresponding respectively to the individual digits of the code, the number and polarity of the straight line segments being controlled by a subgroup of digits comprising $2+\log_2 x$ most significant digits of the $n$-digit code where $x$ equals the number of straight line segments, the remaining digits of said $n$-digit code being employed to control the number of output voltages falling along a straight line segment, at least two evaluation means each responsive to all digits other than the subgroup digits for producing from said selected voltage an output which lies along a linear slope including said voltage and all other possible outputs corresponding to the possible combinations of said digits supplied to said evaluators, means for applying a voltage from said dividing means directly to said evaluation means and means responsive to the remaining digits of said code for combining the outputs from said evaluators to develop instantaneous values corresponding to the received code groups.

19. A pulse converter for decoding $n$-digit code group transmitted according to the reflected binary code and simultaneously producing output voltages which comprise alternating current voltages of envelope levels determined by said code and falling along a selected number of straight line segments rather than a continuous range of values comprising, a source of alternating current of a desired frequency, voltage dividing means for producing from said source a plurality of voltages of amplitude related to said segments, means for distributing the $n$-digits of a received code group for simultaneous occurrence in separate channels corresponding respectively to the individual digits of the code, the number and polarity of the straight line segments being controlled by a subgroup of digits comprising $2+\log_2 x$ most significant digits of the $n$-digit code where $x$ equals the number of straight line segments, the remaining digits of said $n$-digit code being employed to control the number of output voltages falling along a straight line segment, means responsive to the fourth through the $$(2+\log_2 x)\text{th}$$

digit of said subgroup when the number of straight line segments exceeds two for producing from said source voltage levels corresponding to segments to be generated, at least two evaluation means each responsive to all digits other than the subgroup digits for producing from said selected voltage levels an output which lies along a linear slope including said voltage and all other possible outputs corresponding to the possible combinations of the digits supplied to said evaluators and means responsive to the remaining digits of said code for combining the outputs from said evaluators to develop instantaneous values corresponding to the received code groups.

20. A pulse converter for decoding $n$-digit code group transmitted according to the reflected binary code and simultaneously producing output voltages which comprise alternating current voltages of envelope levels determined by said code and falling along a selected number of straight line segments rather than a continuous range of values comprising, a source of alternating current of a desired frequency, voltage dividing means for producing from said source a plurality of voltage levels of amplitude related to said segments, means for distributing the $n$-digits of a received code group for simultaneous occurrence in separate channels corresponding respectively to the individual digits of the code, the number and polarity of the straight line segments being controlled by a subgroup of digits comprising $2+\log_2 x$ most significant digits of the $n$-digit code where $x$ equals the number of straight line segments and two is the largest value of $x$, the remaining digits of said $n$-digit code being employed to control the number of output voltages falling along a straight line segment, at least two evaluation means each responsive to all digits other than the subgroup digits for accepting said voltage levels and producing outputs the envelopes of which lie along linear segments including said voltage levels corresponding to the possible combinations of the digits supplied to said evaluators, means for applying voltages from said dividing means directly to said evaluation means and means responsive to the remaining digits of said code for combining the outputs from said evaluators to develop instantaneous values corresponding to the received code groups.

No references cited.